United States Patent Office 3,024,110
Patented Mar. 6, 1962

3,024,110
PROCESSES FOR PRODUCING DISPERSIONS OF REFRACTORY METAL OXIDES IN MATRIX METALS
John T. Funkhouser, Kennett Township, Chester County, Pa., and Paul C. Yates, Brandywine Hundred, Del., assignors to E. I. du Pont de Nemours and Company, Wilmington, Del., a corporation of Delaware
No Drawing. Filed July 21, 1958, Ser. No. 749,612
4 Claims. (Cl. 75—206)

This invention relates to processes for producing dispersions of refractory metal oxides in matrix metals, and is more particularly directed to such processes comprising fusing (a) an oxygen-containing compound of a matrix metal having an oxide with a free energy of formation at 27° C. of up to 75 kilocalories per gram atom of oxygen in the oxide, and (b) an oxygen-containing compound of a metal having an oxide with a free energy of formation at 1000° C. greater than 60 kilocalories per gram atom of oxygen in the oxide, heating the fused mixture to a temperature at which non-oxide constituents are decomposed to oxides, quenching the melt to obtain a solid-state mass comprising oxides of the matrix metal and of the other metal, finely dividing the mass, reducing the oxide of the matrix metal, whereby a dispersion, in the matrix metal, of particles of a refractory oxide of the other metal is obtained, and sintering the reduced product until its surface area is less than one square meter per gram.

The so-called "super alloys" have been developed for service at extremely high temperatures and very high stress and strain and with a maximum possible service life. In each of these directions, however, substantial additional improvement is greatly desired. It has recently been proposed to improve the properties of metals, including super alloys, by dispersing in them small fragments of refractory materials, on the theory that the fragments would lodge at the grain boundaries and prevent slippage, whereby the metals would be hardened. It has been suggested, for instance, to use various high-melting metalloids as the refractory particles. However, the means for effecting such dispersion of metalloids in metals have been subject to various objections.

More recently it has been suggested to effect dispersion of refractory oxide particles in matrix metals by various coprecipitation methods, starting with aqueous dispersions or solutions. Such methods are indirect, involving handling large volumes of liquids, and require many time-consuming and expensive procedures such as filtering and washing of precipitates.

Now according to the present invention processes are provided which more directly produce the desired dispersions of refractory oxides in matrix metals and eliminate many of the procedural steps heretofore thought necessary. Thus, in the present invention, an oxide of the matrix metal or an oxygen compound which upon heating decomposes to an oxide is fused with a refractory metal oxide or oxygen-containing metal compound which upon heating decomposes to form such a refractory oxide, and the fused mixture is heated to a temperature sufficient to convert or decompose any non-oxide constituents to oxides, the melt is quenched to obtain a solid-state mass comprising oxides of the matrix metal and of the other metal, the mass is finely divided as by grinding, and the oxide of the matrix metal is reduced, as with a gaseous reducing agent, to give a dispersion, in the matrix metal, of particles of the refractory metal oxide, and the reduced product is sintered until its surface area is less than one square meter per gram. It will be seen that such processes require a minimum of procedural steps, making them inherently inexpensive to operate.

For convenience in describing this invention, certain abbreviations will be used. Free energy of formation will be kilocalories per gram atom of oxygen in the oxide, as determined at 27° C. unless otherwise specified, and will be called $\Delta F$. Surface areas of the refractory oxides will be in terms of square meters per gram, and particle diameters will be millimicrons, abbreviated $m\mu$. Particle densities will be grams per milliliter. The particulate refractory oxide will sometimes be referred to as the filler.

The starting materials used in processes of the invention comprise oxygen compounds of metals which are oxides, hydrous oxides, and compounds which on heating decompose to oxides. In the fused mixture, before quenching, there are two classes of oxides of metals, namely, (a) an oxide of a matrix metal, said metal being one which has an oxide with a free energy of formation at 27° C. of up to 75 kilocalories per gram atom of oxygen in the oxide, and (b) a refractory metal oxide, having a free energy of formation at 1000° C. above 60 kilocalories per gram atom of oxygen in the oxide. The latter oxide will be referred to hereinafter as the refractory or filler oxide.

More specifically the metals in the following table are classed as matrix metals for the purpose of the present disclosure:

| Matrix metal | Oxide | $\Delta F$ of oxide at 27° C |
|---|---|---|
| Iron | $FeO$ | 59 |
| Cobalt | $CoO$ | 52 |
| Nickel | $NiO$ | 51 |
| Copper | $Cu_2O$ | 35 |
| Cadmium | $CdO$ | 55 |
| Thallium | $Tl_2O$ | 40 |
| Germanium | $GeO_2$ | 58 |
| Tin | $SnO$ | 60 |
| Lead | $PbO$ | 45 |
| Antimony | $Sb_2O_3$ | 45 |
| Bismuth | $Bi_2O_3$ | 40 |
| Molybdenum | $MoO_2$ | 60 |
| Tungsten | $WO_2$ | 60 |
| Rhenium | $ReO_3$ | 45 |
| Indium | $In_2O_3$ | 65 |
| Silver | $Ag_2O$ | 3 |
| Gold | $Au_2O$ | 0 |
| Ruthenium | $RuO_2$ | 25 |
| Rhodium | $Rh_2O$ | 20 |
| Palladium | $PdO$ | 15 |
| Osmium | $OsO_4$ | 20 |
| Platinum | $PtO$ | 0 |

The refractory or filler oxide is a relatively non-reducible oxide—that is, one which is not reducible to the corresponding metal by hydrogen or by the matrix metal in which it is to be embedded, at temperatures below 1000° C. Such fillers have a free energy of formation at 1000° C. of more than 60 kilogram calories per gram atom of oxygen in the oxide. The filler can be a mixed oxide, particularly one in which each oxide conforms to the melting point and $\Delta F$ above stated. Thus, magnesium silicate is a mixed oxide of $MgO$ and $SiO_2$. Each of these oxides can be used separately; also their products of reaction with each other are useful. Thus, the filler is a single metal oxide or a reaction product of two or more metal oxides; also, two or more separate oxides can be used as the filler. The term "metal oxide filler" broadly includes spinels, such as $MgAl_2O_4$ and $ZnAl_2O_4$, metal carbonates, such as $BaCO_3$, metal aluminates, metal silicates, such as magnesium silicate and zircon, metal titanates, metal vanadates, meal chromites, and metal zirconates. With specific reference to silicates, for example, one can use complex structures, such as sodium aluminum silicate, calcium aluminum silicate, calcium magnesium silicate, calcium chromium silicate, and calcium silicate titanate.

Typical single oxide fillers are silica, alumina, zirconia, titania, magnesia, hafnia, and the rare earth oxides including didymium oxide and thoria. A typical group of suitable oxides, and their free energies of formation is shown below:

| Oxide: | ΔF. at 1000° C. |
|---|---|
| $Y_2O_3$ | 125 |
| CaO | 122 |
| $La_2O_3$ | 121 |
| BeO | 120 |
| $ThO_2$ | 119 |
| MgO | 112 |
| $UO_2$ | 105 |
| $HfO_2$ | 105 |
| $CeO_2$ | 105 |
| $Al_2O_3$ | 104 |
| $ZrO_2$ | 100 |
| BaO | 97 |
| $ZrSiO_4$ | 95 |
| TiO | 95 |
| $TiO_2$ | 85 |
| $SiO_2$ | 78 |
| $Ta_2O_5$ | 75 |
| $V_2O_3$ | 74 |
| $NbO_2$ | 70 |
| $Cr_2O_3$ | 62 |

It will be understood that the two classes of oxides above described are not actually present in the melt as such. Rather, the two metals and oxygen are present in the proportions corresponding to the separate oxides but actually the oxides are present as glasses or compounds which are double oxides of the two metals.

THE STARTING MATERIALS

Since oxygen-containing compounds are converted in the processes of this invention to the oxides, one may start with the oxides or with any oxygen-containing compound which upon heating will decompose to the oxide. Thus, one may start with the nitrate salts of both the matrix metal and the other metal. Similarly, there can be used the carbonates, oxalates, hydroxides, hydrated oxides, acetates, sulfates, sulfites, or other compounds which will hydrolyze or oxidize to oxides.

Ordinarily the oxides of the metals involved are as readily available as the other oxygen compounds and hence their use is greatly preferred. In referring to oxides it will be understood that hydrous oxides and hydroxides are included as preferred starting materials.

THE FUSION

In the processes of the invention, the oxides, or compounds or elements which upon heating in air will give the oxides, are usually first combined physically in any convenient manner. For example, this can be done by grinding, ball milling, or tumbling the ingredients together.

They are then fused by exposing the physical mixture to a temperature, and for a time, sufficient to cause an intimate chemical combination of the oxides to occur on an atomic scale, such that the individual identity of the oxides is lost or modified. The temperature and time of heating required to do this will naturally vary somewhat with the particular pair, or several oxides, concerned; but will usually lie in the range of from two-thirds the melting point of the lower melting oxide to twice the melting point of the higher melting oxide.

The time of heating required to effect this chemical combination will also vary with the particular nature of the oxides as well as with the temperature to which the mixture is exposed. In general, however, the time of heating will be in the range of from a few minutes to twenty-four hours.

It should be noted that the time and temperature of heating required to effectuate the chemical combination of the oxides are inversely related, and it will be found in general that the higher the temperature of the fusion step, the shorter is the heating time required. Thus, times near the lower limit of those mentioned will generally be used at temperatures approaching the upper limits, whereas times near the upper limit will be combined with temperatures which are near the lower limit. If the starting materials are compounds other than oxides, the heating should be continued until all such compounds are converted to oxide form.

While the considerations just given will ordinarily be sufficient to enable one skilled in the art to determine the conditions required for the fusion step, it is always possible to determine whether the fusion step has been satisfactorily completed by means of any of several conventional physical measurements. For example, the material undergoing fusion can be examined continuously by X-ray diffraction, using X-ray diffraction equipment suitably arranged for observation at high temperatures; and the disappearance of characteristic diffraction lines of the individual oxides, or their modification, will serve as a quantitative indication of the extent to which the fusion reaction has progressed.

Other conventional procedures can alternatively be used to determine the point at which fusion has been successfully accomplished. One may, for example, measure the depression of the freezing point of a molten oxide by the second oxide, or follow changes in density, refractive index, viscosity, or conductivity, as well as various other physical properties which can serve as sensitive measures of the extent of chemical interaction or reaction.

QUENCHING

Upon completion of the fusion step, the chemically combined oxides must be brought to room temperature for further processing. Some precautions are observed in the manner in which this is done. Even after an intimate chemical combination of the oxides has been effected, and a homogeneous dispersion of the chemical constituents of the refractory oxide in the chemical constituents of the oxides of the matrix metal has been formed, it is frequently necessary to exercise considerable care in the manner in which the fused mixtures are cooled. Many oxide systems, if cooled slowly, can revert to their separate constituents, or at least to a multiphase structure comprising more than one species.

While this is not necessarily harmful as long as it occurs only on a limited scale, it is definitely harmful when such separation of constituents or segregation into several phases occurs so extensively as to lead to the formation of large crystals of the individual separate phases. In the processes of this invention the extent of such growth of the phases is carefully limited to the microcrystalline region of particle size. By this it is meant that the individual particles of each of the phases containing the chemical constituents of the refractory oxide, if more than one phase is formed, are present in particle sizes no larger than 1 micron, and preferably no larger than 100 millimicrons.

This undesirable separation and growth or segregation of several phases can be prevented by accomplishing the quenching operation with sufficient rapidity. In general, quenching should be completed within from thirty seconds to two hours. Once the temperature has been dropped below the point at which rapid growth of the separate phases can occur, which is usually about one-half the melting point (on the absolute temperature scale) of the lower melting oxide, no further difficulty is experienced.

Any of the procedures normally used to obtain rapid quenching can be satisfactorily employed. The fused oxides can, for example, be exposed to air at room temperature to accomplish a rapid air quench, or, alternatively, they can be quenched even more rapidly by immersion in a liquid of high heat capacity such as water or a high-boiling petroleum oil. In some instances, it is advantageous to atomize the fused mixture in order to attain small particles which will lose heat more rapidly to the surroundings. This may be done prior to or simultaneously with the quenching step.

While it is usually desirable to accomplish the quenching operation in an extremely rapid fashion as described above, there are certain instances when this is not critical. This is particularly true of those combinations of oxides which have appreciable solid solubility with each other at room temperature. Isomorphous pairs of oxides are particularly preferred in this respect.

In summary, the quenching step is characterized by decreasing the temperature of the fused, reacted oxide mixtures at such a rate as to preclude the formation of individual particles of any separate phases containing the chemical constituents of the refractory oxide larger in size than 1 micron and preferably such particles should be no larger than 100 millimicrons. This can be accomplished by quenching from the fusion temperature to a temperature below one-half the melting point on the absolute scale of the lower melting oxide in a time of from thirty seconds to two hours.

The quenched oxide mixtures can comprise several physical and chemical structures. In some instances the products will be amorphous glasses; in other cases, as previously noted, they can comprise crystalline solid solutions of one oxide in the lattice of the other; they can also be microcrystalline mixtures of two or more oxide phases. Other possibilities also exist; such as, for example, a dispersion of a microcrystalline phase within an amorphous glass matrix. Whatever the precise physical or chemical structure obtained all of the fused and quenched oxides are generically equivalent in their applicability to the processes of this invention in that they comprise homogeneous dispersions, on a colloidal or smaller level, of the chemical constituents of the refractory oxide within a matrix comprising the chemical constituents of the matrix metal oxide.

While, for the purpose of clarity in presentation, the operations of mixing, fusion, and quenching described above have been discussed separately, it is to be understood that they can be accomplished in very rapid succession one after the other, even to the point of being performed virtually simultaneously, as in the case of the mixing and fusion steps. Quenching may be performed at any time after fusion is completed.

FINELY DIVIDING THE MASS

After the fused mass has been quenched, it should be reduced in particle size, as by grinding. This can be done by any technique with which the art is familiar, as, for example, by Raymond milling or hammer milling or ball milling. In the preferred case, particle size is reduced essentially to very finely divided powder, in the micron size range, as, for example, below 325 mesh.

REDUCING THE MATRIX METAL OXIDE

When reference is made herein to reducing the matrix metal oxide it will be understood that reduction of the component of the fused mass corresponding to the matrix metal oxide is meant and that this oxide component is, of course, chemically associated with the refractory metal oxide prior to such reduction.

The reduction can be conveniently accomplished by subjecting the finely divided quenched mass to contact with a stream of gaseous reduction agent such as hydrogen. During the reduction, the temperature should not be allowed to exceed the melting point of the matrix metal. Ordinarily, with compounds of metals such as iron, cobalt, nickel, copper, molybdenum, and rhenium, reduction can be initiated in the temperature range of from 500 to 800° C.

In practice, the material to be reduced is placed in a furnace at a controlled temperature and a reducing gas such as hydrogen is added. The reduction should not be allowed to proceed so rapidly that large amounts of heat are liberated and the temperature in the furnace is increased above the temperature of the melting point of the matrix metal.

The hydrogen used in the reduction can be diluted with an inert gas such as argon to reduce the rate of reaction and avoid "hot spots." In this way the heat of reaction is carried away in the gas stream. Alternatively, the temperature in the furnace can be slowly raised into the range of 500 to 1000° C. while maintaining a flow of hydrogen over the product to be reduced.

In addition to or instead of hydrogen, other reducing gases, such as carbon monoxide or methane and other hydrocarbon gases, can be used as the reducing agent. In any case, it is important to control the temperature during reduction, not only to avoid premature sintering as above mentioned, but also that excessive reaction will not occur between the reducible matrix metal compound and the filler oxide prior to complete reduction of the matrix metal compound. Alternatively, solid reducing agents such as the alkali or alkaline earth metals can be used. In this case the reduction can be carried out in fused salt such as in molten calcium chloride or other halide salts.

Reduction should be continued until the matrix metal compound is essentially completely reduced. When reduction is nearing completion, it is preferred to raise the temperature, in the case of such metals as iron, cobalt and nickel, to the range between 700 and 1300° C. to complete the reaction, but care must be taken not to exceed the melting point of the reduced metal. During the reduction process very fine metal grains are formed. These tend to fuse and grow, but their ultimate size is restricted because of the presence of the filler particles. Thus, the size of the grains obtained in this way is usually less than 10 microns.

Reduction should be carired out until the oxygen content of the mass is substantially reduced to zero, exclusive of the amount of oxygen originally introduced in the form of the oxide filler material. In any case, the oxygen content of the product, exclusive of the oxygen originally introduced in chemically combined form in the filler, should be in the range from 0 to 2 percent and preferably from 0 to 0.1 percent, based on the weight of the product.

The analysis for oxygen can be done by many methods with which the art is familiar, one such method being vacuum fusion as described by R. A. Yeaton in Vacuum, vol. 2, No. 2, page 115, "The Vacuum Fusion Technique as Applied to Analysis of Gases in Metals."

After the reduction reaction is complete, the resulting powder is sometimes pyrophoric. For this reason, a sintering step as hereinafter described is used to reduce the surface area and eliminate this pyrophoric character.

The product of the reduction reaction is a dispersion, in the matrix metal, of particles of refractory metal oxide. It can be compacted as hereinafter described or it can be first blended with additional powdered matrix metal or other powdered metals before compaction.

SINTERING THE REDUCED PRODUCT

After the matrix metal compound has been reduced to the corresponding metal the product is sintered by heating it to an elevated temperature which is, however, below the melting point of the metal. It will be recognized that when very high temperatures are used during the reduction step, some sintering can occur simultaneously with reduction; however, such temperatures should be reached only after the reduction has proceeded to a considerable degree and preferably is substantially complete.

The sintering insures that the products will not be readily reoxidized in air.

Sintering of the product is continued until the surface area is lowered below 1, and preferably below 0.1, square meter per gram. Such products are not pyrophoric and can be handled in air.

It has been observed that the temperature required to obtain the desired degree of sintering varies with the loading of the filler in the metal. In general, the higher the loading, the higher is the sintering temperature required.

It is important that, during this sintering operation, the melting point of the metal be not exceeded. Actually, it is preferred to maintain the temperature at least 50 centigrade degrees below the melting point.

COMPACTING THE REDUCED PRODUCT

The reduced products can be compacted according to techniques with which the art is already familiar, until the density of the compacted mass is from 90 to 100 percent of the theoretical density. Thus, the products can be compacted by pressing in a die, by extruding, by rolling, by swaging or by any method used in powder metallurgy.

The green compact formed as above described can be further treated by sintering it, as at temperatures up to 90 percent of its melting point for up to twenty-four hours, to give it sufficient strength to hold together during subsequent working operation. Preferably such sintering is effected in an atmosphere of clean, dry hydrogen.

To develop maximum strength in the refractory oxide-filled matrix metal, the formed body obtained as above described can be subjected to intensive working, preferably at elevated temperatures. The working forces should be sufficient to effect plastic flow in the metal. Working should be continued until homogenization of the filler-matrix metal grains is substantially complete. Homogeneity can be determined by metallographic and chemical analyses.

While working can be accomplished by such methods as swaging, forging and rolling, it is especially preferred to effect working by extruding the above-mentioned green compact through a die under extreme pressure, at temperatures approaching the melting point of the metals present, say, from 85 to 95 percent of the melting temperatures in degrees absolute. Because the products are very hard, the working conditions needed are much more severe than for the unmodified metals. In the case of extrusion of a billet, the reduction in cross-sectional area preferably is upwards of 90 percent. Welding of the metal grains becomes nearly complete.

PREPARATION OF ALLOYS

It will be understood that the processes of this invention can be used to make alloys directly, in addition to the blending methods already mentioned. Thus, there can be included in the original melt oxygen-containing compounds such as oxides of two or more matrix metals. Upon reducing, an alloy is obtained of the matrix metals. For example, an iron-chrome alloy containing $Al_2O_3$ can be prepared by fusion of $Fe_2O_3$, $Al_2O_3$ and $Cr_2O_3$, and thereafter reducing the fused mass with very pure hydrogen at about 1200° C., so that Fe—Cr—$Al_2O_3$, is the result. Also, alloys like MgO—Ni—Co, CaO—Ni—Cu, MgO—Mo—Ni, $ThO_2$—Mo—W, and $La_2O_3$—Fe—Mo can be prepared by the fusion process of this invention.

UTILITY OF THE PRODUCT

The products obtained as above described have substantially improved properties. The metals and alloys have improved strength and hardness, especially at high temperatures, by reason of the inclusion of the dispersed refractory oxide particles. Thus, the higher-melting metals are suitable for use as components in high-temperature systems such as in jet engines and heat exchangers.

EXAMPLES

The invention will be better understood by reference to the following illustrative examples:

Example 1

This example illustrates a process of the invention as applied to the production of a dispersion of a refractory oxide, alumina, in iron as the matrix metal.

One hundred parts by volume of $Fe_2O_3$ were intimately mixed, in a ribbon blender, with 10 parts by volume of anhydrous $Al_2O_3$ prepared by the thermal dehydration of alumina trihydrate. The oxide mixture was heated in a gas-fired furnace for four hours at 1400° C., after which X-ray examination of the product showed it to be a solid solution of $Al_2O_3$ in $Fe_2O_3$. This mixture was ground and screened to give a −100 mesh screen size material, which was then placed in a furnace equipped with a hydrogen inlet valve, so that hydrogen gas could be swept across the fused oxide powder.

Initially, a current of nitrogen was passed over the oxides until the temperature had obtained 450° C. The flow of nitrogen was then slowly cut back and a flow of hydrogen was increased, until, after four hours, the furnace atmosphere consisted essentially of pure hydrogen. The flow of hydrogen was maintained for a period of six hours, while the temperature was kept between 400 and 450° C., after which the temperature was slowly increased over a period of three hours to 600° C., held at this point for three hours, and finally the temperature was increased to 900° C. and held there for thirty minutes.

The reduced iron powder, containing a very fine dispersion of alumina in metallic iron, was then cooled under a current of hydrogen to 70° F. so that it could be removed from the furnace without danger of reoxidation. The powder had a surface area of 0.2 square meter per gram.

The powder was used to prepare an alloy of iron, chromium, and nickel containing $Al_2O_3$ by mixing it with chromium and nickel powders, compressing the mixed powders at a pressure of 20 tons per square inch to form a green billet, sintering this billet for 12 hours at 1300° C. in extremely dry, pure hydrogen, and hot-rolling the sintered billet to give a final composition of iron, chromium and nickel wherein the weight ratio of iron to chromium to nickel was 72 percent iron, 18 percent chromium, and 10 percent nickel, and the alumina was approximately 7 volume percent.

The high temperature mechanical properties of this alloy were substantially improved over those of conventional stainless steel containing no dispersed alumina.

The surface of this alloy was polished electrolytically, carbon was deposited on it, and the surface layer of metal was etched away to leave a carbon replica of the metal surface adhering to the dispersed alumina particles. An electron micrograph of this replica at a magnification of 20,000× showed the $Al_2O_3$ particles to comprise discrete, dense particles of $Al_2O_3$ in the particle size range of 100 to 300 millimicrons. The micrographs indicated that these particles had been substantially homogeneously distributed in the original iron powder.

An improved steel alloy was also prepared from this composition by mixing it with finely divided carbon, pressing the carbon-iron-alumina mixture into a billet at a pressure of 20 tons per square inch, and sintering at a temperature of 1100° for a period of six hours. After again pressing the billet at a pressure of 20 tons per square inch and a temperature of 600° C., followed by a second sintering operation for four hours at 1100° C., a steel of substantially better than 95 percent of theoretical density was obtained, which showed much lower creep at elevated temperatures than a comparable steel sample which did not contain the dispersed alumina.

Example 2

The process of Example 1 was repeated, using with the Fe₂O₃, in place of the alumina, 1 percent and 10 percent by volume mixtures of the following oxides: thoria, zirconia, magnesium oxide, calcium oxide, cerium oxide, and titania. The procedures of fusion, reduction, and fabrication into dense metal or metal alloy specimens of these oxide dispersions in iron was substantially identical with those shown in Example 1. Examination of the dense metal specimens obtained, by electron micrograph replica techniques, showed that dispersions had been formed containing particles in the size range of 10 millimicrons to 1 micron, with the particle size in a particular instance depending primarily upon the oxide selected and the temperature exposure conditions during the processing. In general, those oxides having the higher free energy of formation per oxygen atom formed the smallest particles. It was also generally true that the lower the temperature of the initial reduction of the fused oxide mixture, and the lower the temperatures used in subsequent fabrication procedures, the smaller was the size of the oxide particles. By controlling the temperature during reduction and in later fabrication steps, even the oxides having relatively low free energies of formation, such as titania, could be obtained in relatively small particle sizes. In all instances, dense metal objects and metal alloy objects prepared from such oxide-containing iron powders showed substantial improvements in mechanical properties over those of comparable metal objects or alloys similarly prepared and processed, but containing no oxide.

*Example 3*

The processes of Examples 1 and 2 were repeated, except that nickel oxide and magnesium oxide were used as the starting materials. The reduction operation was performed in substantially the same manner, except that the final top temperature used was 600° C., and the last thirty-minute heating stage described in the reduction procedure of Example 1 was not employed. The nickel, containing magnesium oxide particles in the size range of 100 millimicrons, attained after completion of this reduction cycle, was alloyed by powder metallurgy with copper metal in a ratio of thirty parts of nickel to 70 parts of copper. The resulting modified cupronickel alloy containing the dispersed oxide was found to have much better high-temperature strength (yield strength and ultimate tensile strength) and better stress-rupture properties than a comparable nickel-copper alloy which did not contain the dispersed oxide particles.

*Example 4*

A process similar to that shown in Example 1 was followed in this instance, except that the formation of the initial mixed-oxide composition was accomplished by mixing scrap iron with aluminum oxide and igniting the mixture in a blast of ar in a forced-draft blast furnace. Results obtained were substantially equivalent to those which have already been discussed in Example 1.

*Example 5*

This example is substantially similar to Example 1, except that the starting fused oxide composition in this instance was prepared by burning an iron-aluminum alloy by striking an electric arc between the alloy fabricated as an electrode and a water-cooled iron electrode in an atmosphere containing oxygen. Upon striking the arc, the alloy vaporized and burned on coming in contact with the oxygen-containing atmosphere, thereby depositing a finely divided soot or smoke of the mixed oxide which had the same relative proportions of iron to aluminum as were present in the original alloy. The original alloy composition had been prepared to contain an iron-to-alumina ratio such that the final composition would comprise a 5 percent by volume dispersion of the refractory oxide in the metal after the reduction stage of the processing. Particle sizes and results obtained upon using these compositions to prepare dense metallic objects were comparable to those mentioned in Example 2.

*Example 6*

This example illustrates the application of a process of the invention to the preparation of the refractory oxide, silica, in lead as the matrix metal.

A reaction mixture was prepared by ball milling finely divided silica flour with lead oxide (litharge). The composition of the resulting mixture was such that 5 parts by volume of silica was present based on the volume of the lead which would result from the reduction of the lead oxide. This mixture was then heated above the melting point of the lead oxide to dissolve the silica and form a silicate-modified lead oxide glass. This glass was ball milled and screened to −100 mesh, and the lead oxide component was then reduced at a temperature of 240° C. in a stream of hydrogen gas. After twenty-four hours reduction, the resulting lead, containing dispersed silica, was pressed at room temperature at a pressure of 20 tons per square inch to give a billet which was sintered in a hydrogen atmosphere for four hours at 200° C. This billet was extruded at a temperature of 200° C. using a reduction ratio from an original diameter of 1 inch to a final diameter of ¼ inch. The lead rod so prepared had an unexpectedly high yield and tensile strength, and showed no evidence of creeping at room temperature, under conditions where lead containing no dispersed silica particles exhibited rapid creep.

*Example 7*

A procedure analogous to that used in Example 6 was applied to the preparation of a fused oxide mixture of molybdic oxide and calcium oxide. The molybdic oxide compound of the resulting mixture was reduced in hydrogen at a temperature of 500° C., this temperature being finally increased, after reduction was 75 percent complete, to a temperature of 800° C. Fabrication of the resulting metallic powder of molybdenum metal containing calcium oxide was effected by pressing, sintering, and hot swaging operations conventional in the powder metallurgy of tungsten and molybdenum, and the final product tested for mechanical properties.

At a temperature of 2000° F., it showed much lower creep rate and much longer stress-rupture time than comparable molybdenum products containing no dispersed particles.

We claim:

1. In a process for producing a dispersion of a refractory metal oxide, in the form of particles in the 10 to 1000 millimicron size range, in a matrix metal which dispersion can be hot worked by extrusion through a die under extreme pressure at temperatures approaching the melting point of the metal, the steps comprising fusing (a) an oxygen-containing compound of a matrix metal, said metal having an oxide with a free energy of formation at 27° C. of up to 75 kilocalories per gram atom of oxygen in the oxide, and (b) an oxygen-containing compound of another metal, said metal having an oxide with a free energy of formation at 1000° C. greater than 60 kilocalories per gram atom of oxygen in the oxide, heating the fused mixture to a temperature at which non-oxide constituents are decomposed to oxides, quenching the fused melt to obtain a solid-state mass comprising combined oxides of the matrix metal and the other metal, finely dividing the mass, reducing the oxide of the matrix metal to the metal at a temperature below the melting point of the metal, the reduction being continued until the oxygen content of the product, exclusive of the oxygen originally introduced in chemically combined form in the filler, is in the range of 0 to 2% by weight, whereby a dispersion, in the matrix metal, of particles of a refractory oxide of the other metal is obtained, and thereafter sintering the reduced product, before exposing it to an oxidizing atmosphere, until its surface area is less than one square meter per gram.

2. A process of claim 1 in which the product obtained by the reduction is compacted until its density is greater than 90 percent of theoretical density.

3. A process of claim 1 in which the reducing agent is hydrogen.

4. In a process for producing a dispersion of a refractory metal oxide, in the form of particles in the 10 to 1000 millimicron size range, in a matrix of chromium metal alloy which dispersion can be hot worked by extrusion through a die under extreme pressure at temperatures approaching the melting point of the metal, the steps comprising fusing (a) an oxygen-containing compound of a matrix metal, said metal having an oxide with a free energy of formation at 27° C. of up to 75 kilocalories per gram atom of oxygen in the oxide, (b) an oxygen-containing compound of another metal, said metal having an oxide with a free energy of formation at 1000° C. greater than 60 kilocalories per gram atom of oxygen in the oxide, and (c) an oxide of chromium, heating the fused mixture to a temperature at which non-oxide constituents are decomposed to oxides, quenching the fused melt to obtain a solid-state mass comprising combined oxides of the matrix metals and the other metal, finely dividing the mass, reducing the oxides of the matrix metals to the metals at a temperature below the melting point of the metals, the reduction being continued until the oxygen content of the product, exclusive of the oxygen originally introduced in chemically combined form in the filler, is in the range of 0 to 2% by weight, whereby a dispersion, in the matrix metals, of particles of a refractory oxide of the other metal is obtained, and thereafter sintering the reduced product, before exposing it to an oxidizing atmosphere, until its surface area is less than one square meter per gram.

References Cited in the file of this patent
UNITED STATES PATENTS

| | | |
|---|---|---|
| 1,741,953 | Ramage | Dec. 31, 1929 |
| 2,785,974 | Moore | Mar. 19, 1957 |
| 2,893,859 | Triffleman | July 7, 1959 |